United States Patent Office 3,116,408
Patented Dec. 31, 1963

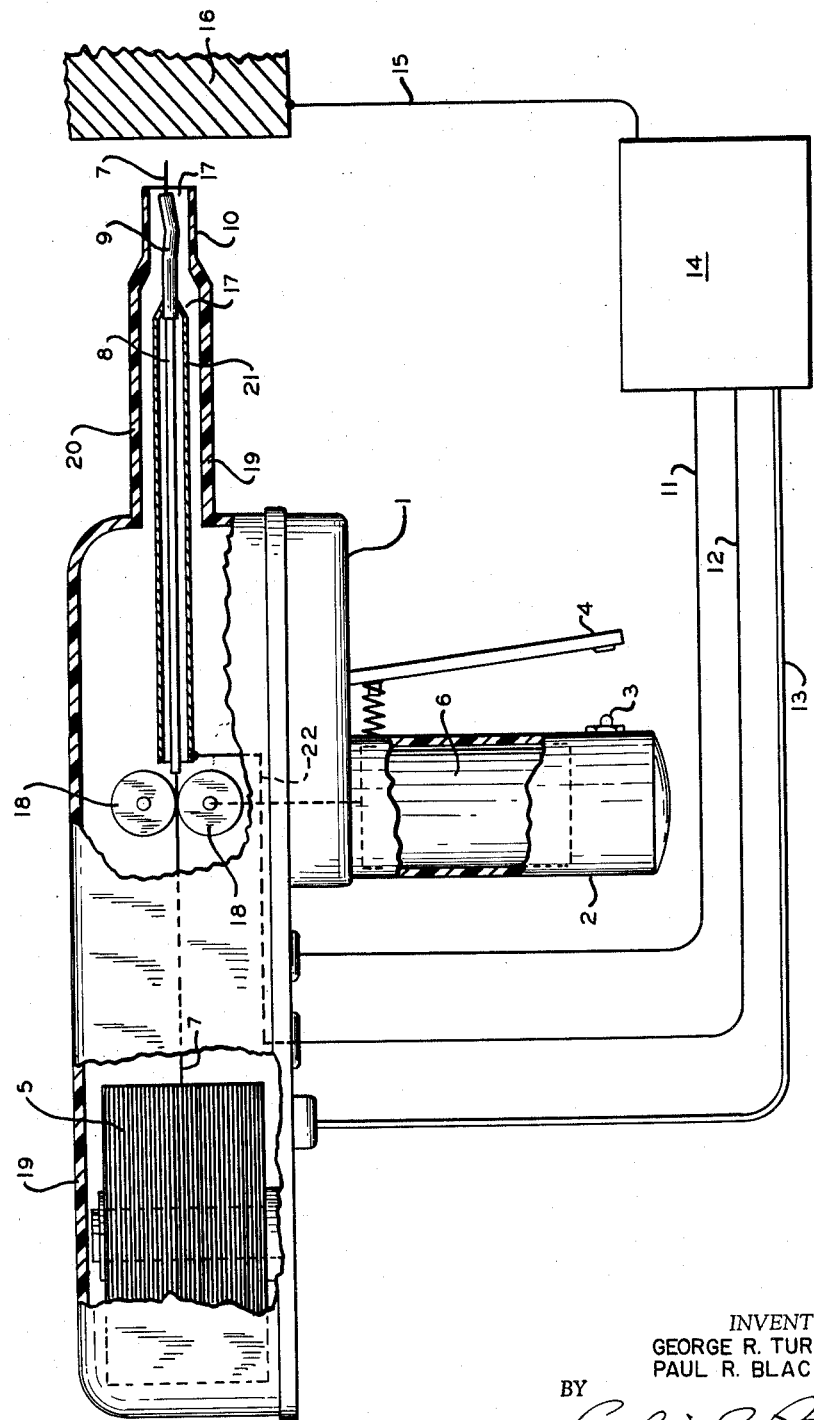

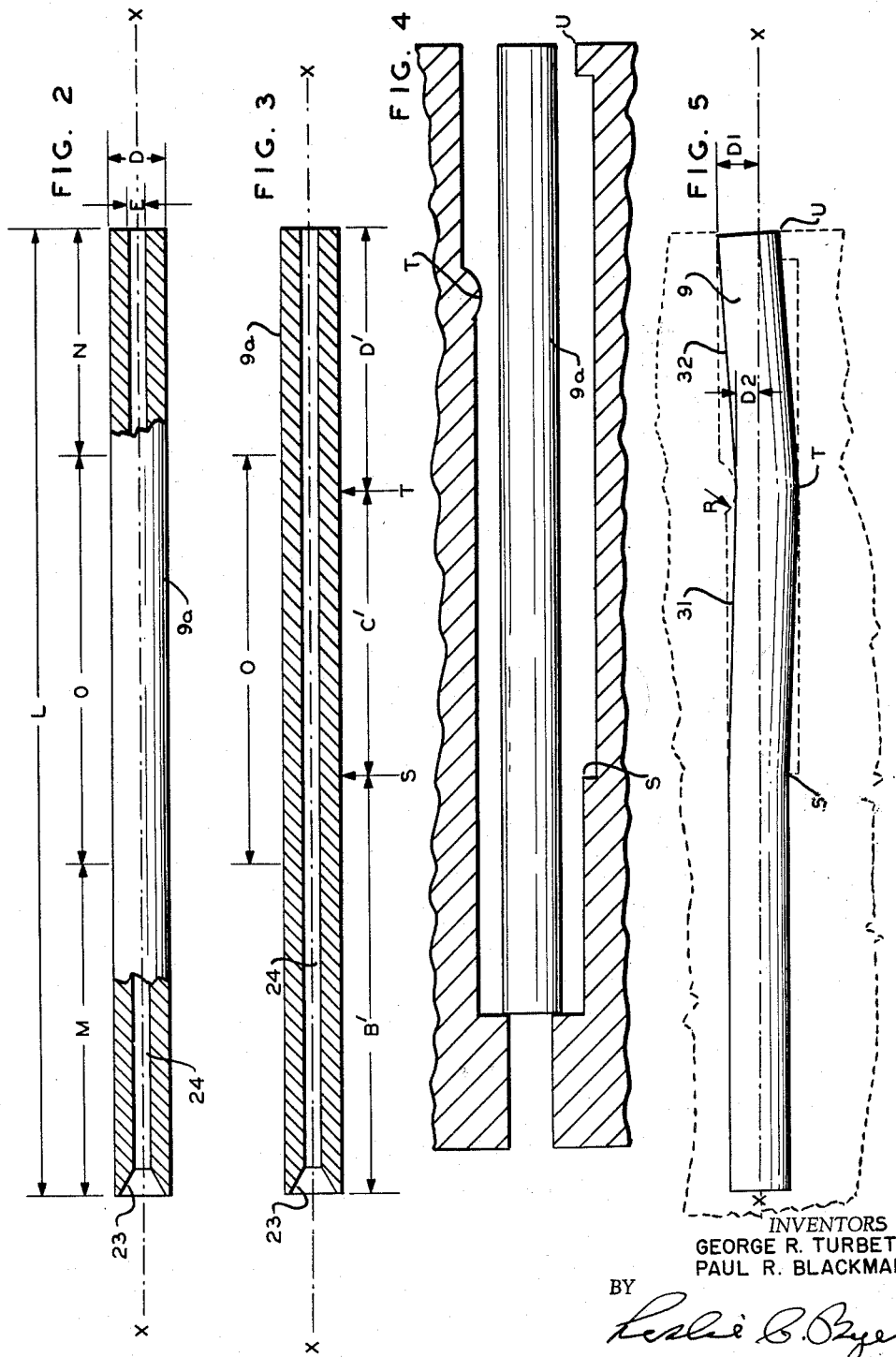

3,116,408
WELDING APPARATUS AND METHODS
George R. Turbett, Chatham Township, and Paul R. Blackman, Cranford, N.J., assignors to Air Reduction Company, Incorporated, New York, N.Y., a corporation of New York
Filed Jan. 26, 1961, Ser. No. 85,143
3 Claims. (Cl. 219—130)

This invention relates to electric welding methods and improved welding apparatus, including improved methods of manufacturing welding apparatus. This invention is more particularly directed to improved welding apparatus that provides better procedures for the supply of electric current to welding wires or welding electrodes. Further this invention provides for an improved method of manufacturing electric current contact conductor feed devices and articles.

In conventional electric welding methods and electric welding apparatus, there are procedures provided wherein the welding wire or welding electrode is fed to a workpiece or arc so the wire may be utilized in the welding operation. The wire or electrode may be of various compositions and normally is chosen on the basis of the type of metal workpiece and/or the welding procedures being employed. Generally, an electric current is fed or passed into the wire and the current conducting wire acts as an electrode and produces an arc with the workpiece during the welding operation. The welding wire is normally consumed in the welding operation and must be fed to the welding workpiece area to continue the welding operation. The welding wire is normally associated with a welding gun or similar apparatus with provisions for feeding the welding electrode to the welding operation as required. In the welding apparatus there is usually contained a nozzle portion which includes a welding wire guide or welding wire contact tube. The contact tube is normally inside the nozzle and the nozzle also usually includes provision for the supply of welding gases. The contact tube provides for the feeding or passage of electric current to the electrode.

The contact tube must provide adequate and proper passage of electric current to the welding electrode in order that satisfactory welding operations may result. Conventional contact tubes may present difficulties in proper current supply because of poor design characteristics and problems resulting from the manner of manufacture of these tubes.

These difficulties may result because of the shape and configuration of these contact tubes, and it is possible that under certain conditions of wire speed, wire temper, and cast of the wire, improper or poor electric contact may be obtained, which results in inadequate or poor arc characteristics. Thus, in certain cases the welding arc may be extinguished and a restart would become necessary or the contact tube may have to be replaced. Another problem encountered is that of galling; which is more noticeable with welding wires as aluminum which have an external oxide layer or film. The oxide layer may flake off due to distortions or rough surfaces on the internal bore of the contact tube. These particles will then plug the bore and result in poor wire feed rates or will eventually result in wire stoppage. Internal arcing in the contact tube also results.

Various contact devices such as small diameter tubes, shoe plate contact devices, brush devices, and other devices have been proposed to solve the problems and difficulties relating to maintaining the proper electric current contact properties during the wire feeding operation. While some of these devices have merit, they are not entirely satisfactory since in many cases problems, including those of wire feed rate and poor contact characteristics are still encountered. As indicated previously, one problem is that of galling and wire stoppage. Some of these devices, as the brush type, are complex and expensive to manufacture. Others must be water cooled. In some of the bent tube devices, the design or configuration leads to nozzle design problems. Thus, a tube that is not substantially straight will impede gas flow around the tube and present problems of directing shielding gas to the welding arc. Other prior art devices have the disadvantage of the current transfer point being some distance from the welding arc, which results in excessive heating of welding wire, which is not desirable.

It is, therefore, an object of this invention to provide improved welding apparatus and improved welding methods.

Another object of this invention is to provide improved contact tubes and improved methods of manufacturing such tubes.

A further object of this invention is to provide an improved current contact tube which is useful in welding apparatus and methods wherein improved electric conduction is obtained.

A still further object of this invention is to provide improve apparatus and methods wherein electric current feed to a moving welding wire is employed.

Another object of this invention is to provide a current feed device for a moving welding wire that results in satisfactory and easy arc starting; improved arc stability and improved welding operations.

Another object of this invention is to provide an improved manufacturing method for the production of bent contact tube devices that maintain their improved current conduction properties over a wide range of use or operating conditions.

Another object of this invention is to provide a method of manufacturing bent contact tubes that does not alter or distort the internal surfaces of the contact tube.

A still further object of this invention is to provide a bent contact tube that provides improved contact conditions on the internal surface of the contact tube for welding wire and welding electrodes fed through said contact tube.

These and other objects as well as other advantages of this invention will become apparent and will be clarified in the following description and in connection with the accompanying drawings in which like reference characters refer to similar parts throughout the several views and in which:

FIGURE 1 is a generalized sectional view of a specific welding apparatus or welding gun including a contact tube made in accordance with this invention;

FIGURE 2 is a longitudinal sectional view of a tube prior to final manufacturing steps;

FIGURE 3 is a sectional view similar to FIGURE 2;

FIGURE 4 is a diagrammatic sectional view of a bending fixture used to make contact tubes in accordance with this invention; and FIGURE 5 is a sectional view of a bending fixture and includes a longitudinal sectional view of a bent contact tube having the features of this invention.

FIGURE 1 shows a welding gun 1 or welding apparatus 1 of the pistol or hand grip type. This is illustrative of the apparatus that may be used with the improved contact tube of this invention. However, other apparatus may be used, as in equipment where the wire supply and feed means are not contained in a unitary structure with the contact tube. Thus, the wire supply and feed means may be located some distance from the contact tube.

The welding apparatus 1 has a grip or handle portion 2, which may be held by an operator. The apparatus has a projecting button 3 which when used in combination with the trigger portion 4 operates to control the welding apparatus. A coil of welding wire 5 is located within the apparatus 1 and motor means 6 supplies the necessary power to feed welding wire 7 to the welding operation. The welding wire 7 is fed from the coil 5 through a guiding device 8 to the current contact tube 9. The current contact tube 9 is contained within the nozzle portion 10 of welding apparatus 1. Associated with welding apparatus 1 are control cable 11, welding cable 12 and gas supply conduit 13. The unit 14 indicates the power supply and control units for apparatus 1. Connected to the control and power unit is control cable 11, welding cable 12, and welding cable 15 which is also connected to the workpiece 16. The source and pressure regulation of gas for the gas supply conduit 13 is not illustrated. The nozzle portion 10 of the welding apparatus 1 contains a major portion of the contact tube 9 to which is passed the welding wire 7. The nozzle portion 10 and the contact tube 9 are arranged to provide an annular passage 17, for gas, when used in the welding operation. While not specifically illustrated, the welding apparatus 1 contains passage means for gas, connecting with the gas supply conduit 13 and the annular passage 17. Associated with the wire feed motor are feed rolls 18 which draw wire 7 from coil 5 through guide tube 8 and contact tube 9 to the welding operation. Insulation 19 is provided on the interior portions of nozzle portion 10 and the rearwardly extension 20 of the nozzle portion 10. There is also provided an interior barrel portion 21 which is in contact with the contact tube 9 and provides a portion of the current conducting path 22 between the welding cable 12 and the contact tube 9. There is also room for gas passage means 17 between the barrel portion 21 and the nozzle extension portion 20 which connects with the gas supply conduit 13.

In operation, an electric current is supplied to the wire 7 by the power supply contained in unit 14 connected to the contact tube 9 through which the wire 7 is passed. An arc is established between the end of the wire 7 and the workpiece 16 to initiate the welding operation.

In certain welding operations inert gases as argon, helium, or carbon dioxide or mixtures of these gases are passed through the nozzle to around the contact tube 9, then around the end portions of wire 7 to the arc area of the welding operation on the workpiece 16.

In general, the welding operation comprises the initiation of a welding arc between a welding electrode and a workpiece. The current required for welding is fed to a contact tube and then is fed to the moving wire. It is desirable for the current transfer to be constant, so that the welding operation is not effected by poor transfer properties that will give varying arc voltages. It is also desirable that the current be fed to the wire as close to the arc as possible, in order that excessive heating of the wire is not produced.

Improved features of this invention are illustrated more particularly in FIGURES 2 to 5, involving the manufacturing of the contact tube member 9, and the member 9 itself. The straight tube mmeber 9A, prior to the final manufacturing steps, consists of straight bore tubing having an outside diameter, indicated by the reference letter "D." The internal longitudinal extending bore has a uniform diameter identified by the reference letter "E." The contact tube 9, and the tube member 9A include a flare portion 23 at one end of the passage 24 for the alignment of the end of the guide tube 8. The overall length of the tube member 9A is identified by the reference letter "L" while the dimensions indicated by the reference letter "M" or "N" define an intermediate portion of the total length "L" and said portion is identified by the reference letter "O."

Other portions or dimensions are indicated by the reference letters B', C', and D'. These dimensions B', C', and D' locate points indicated by reference letters "S" and "T." The locations "S" and "T" are the points of bending.

FIGURE 5 of the drawing illustrates a bent contact tube 9 made according to the procedures of this invention. The reference letters "S" and "T" locate the points of bending of the contact tube 9. The end portion of the tube is indicated by the reference letter "U." The contact tube member 9, consists of a straight portion and bent portions 31, 32, The central longitudinal axis "XX" of the straight portion is extended to pass through the bent portion 31, 32, so as to assist in locating or identifying the amounts of offset D1, D2, or degree of bend D1, D2.

The contact tube 9, is preferably made from the straight tube member 9A by bending said tube 9A into the configuration shown in FIGURE 5. It is desirable that the contact tube 9 maintain this configuration after bending and during its use in welding operation. Prior to bending said tube member 9A, the portion of the tube indicated by the dimensional reference "O" is induction heated in a precise and accurate manner. The heat treated length "O" includes the points of bending "S" and "T." The contact tube 9 of this invention is produced by bending the heat treated member 9A. FIGURE 4 illustrates a fixture useful for the bending operation. By the heat treatment the fiber stresses are relieved. This lowering of the elastic stress limit results in the bent portion maintaining the configuration of contact tube 9, as illustrated in FIGURE 5.

As indicated, it is important that the bent contact tube provide satisfactory current contact between the wire and the current carrying interior surfaces of the contact tube. Satisfactory contact tubes are prepared by forming an initial straight bore tubing of hard drawn copper. Hard drawn copper tubing of this type is normally identified as phosphor copper, hard temper, plug or mandrel drawn, and is composed mainly of copper and occasionally other alloying agents as phosphorus. The hard drawn tubing has a Rockwell value of about F-80 or 15-T, 74.5. The internal bore surface is smooth, due to the plug or mandrel drawing. For the purposes of this invention the bore surface should be smooth, so abrading or scouring of the wire does not take place when the welding wire passes through the contact tube.

The hard drawn copper tubing is prepared by a drawing process that results in a fiber stress distribution pattern that is generally the same throughout the tubing. The fiber stress alignment is such that if the untreated tube is bent to exceed the elastic limit, a substantial amount of bending is required. Returning this bent tubing to the degree of bending required for a contact tube results in tubing with a distorted bore and distorted bore surface. Since merely bending the untreated tubing to a degree of bend used in the contact tube of this invention results in a tube that will not retain its bent configuration, it is not possible to bend the tube beyond its elastic limit, and then bend it back again to the degree of bend desired.

In the method of this invention it has been found that if the fiber stresses on the inside surface of the tube are lowered, the tube may be bent in a manner of this invention so as not to result in distortions of the bore and bore surface as well as preventing alterations in the external surface of the tubing. The fiber stress relieving is thought to result in lowering the level of elastic stress, such that when bent, the tube maintains the required or desired bend and does not exhibit conformational changes due to residual stresses and work hardening.

Generally, any heat treatment method that results in the desired relieving of the fiber stresses, is satisfactory. It has been found, however, that an induction heat treatment is preferable, in that accurate and precise control of the degree and time of heat treatment, as well as location of heat treatment is possible. In the induction heating apparatus the zone of induction heating effect is easily and accurately controlled so that the required amount of heat or resulting heat treatment is provided for the tube.

While other methods of stress relieving or normalizing are possible, it is preferred to use the heat treatment.

Referring particularly to FIGURES 2 and 3, there is illustrated the heat treatment area. FIGURES 2 and 3 represent the straight tube member 9A prior to heat treatment. The overall length of the tube 9A is indicated by "L" while the lengths "M" and "N" define the length or the extent of the tubing "O" that is subjected to heat treatment. Generally a range of "L" from about three inches to seven inches is preferred. As indicated, the points of bending "S" and "T" are overlapped by the heat treated area "O." Reference letters B′, C′, D′ locate points "S" and "T." C′ is generally about one and three sixteenths inches; while D′ is generally about one and one sixteenth inches. The length of the straight portion B′ may vary, and it is desirable to maintain the portion C′ and D′ as indicated; should a longer tube be required it is best to provide the excess length in the initial straight portion B′.

The length of heat treatment area "O" should be subjected to the heat treatment for a distance of about one-half inch on both sides of points "S" and "T." While it is possible to heat treat the two zones separately, it is generally simpler, and more advantageous to heat treat the entire portion "O." Therefore "O" is about two inches, while "N" is approximately one-half inch. It is not required or desired that the entire tube be heat treated, in that such treatment may result in the end portions of the tube becoming too soft which would cause rapid wear and thus interfere with proper current conduction and wire feeding.

In the heat treating process the tube 9A is placed in the center of an induction heating coil. The heat treatment is such that the interior length "O" is heated, with the heat being applied for approximately five seconds. The maximum point of heat transfer is at a point approximately in the middle of the distance "O" or about one and one-half inches from the terminal end of member 9A. The amount of heating may be varied, but it should be sufficient to provide the stress relieving desired. In the practice of this invention it has been found that the point of maximum heat transfer will be heated to a bright red color, just prior to the end of the heat application cycle. The area that is effected by the heat treatment may be identified by the discoloration produced on the tube member 9A. The heat treated tube member is immediately quenched with water after the heating cycle is complete. The quenching is required in order that the highly heat conductive tube material does not become heated over its entire length and thus soften portions of the tube member, which may result in rapid wearing. By the heat treatment the fiber stresses throughout the portion of the tube wall over length "O" are relieved. The tube prior to heat treatment has a Rockwell value of F–80 or 15–T, 74.5. After heat treatment the heat treated portion "O" has a Rockwell value of 15T, 44–52. The variation in the "O" portion value results from the fact that entirely uniform heat is not applied to the tube, and the induction heating coil results in a point of maximum heat transfer as previously indicated. These final Rockwell values are preferred.

The bent contact tubes of this invention are made by bending the heat treated tube member 9A into the contact tube 9, configuration, as shown in FIGURE 5. There is illustrated a bending fixture, cross hatched sectional view, in FIGURE 4, and a dotted line outline view in FIGURE 5. The bending fixture comprises two dies which close and produce the required bending at points "S" and "T" of the tube member. The fixture has limiting pins or stops to prevent distortion of the tube. The raised rounded portion R of the fixture applies bending pressure at point "T" on the upper surface of the tube. The recessed portion of the lower die allows the tube member to be bent.

The configuration of the bent tube is defined with reference to FIGURE 5. In general the bent contact tube may be defined as having three portions, a first straight portion, a second bent portion, and a third bent portion. The bent portions are offset from the first straight portion in opposite directions. The amount of the bent portions offsets may be conveniently described in terms of the amount the end of the bent portion is offset from an extension of a central longitudinal axis through the first straight portion. The offsets are identified as "D2" and "D1," while the central axis is "XX" in FIGURE 5.

In general the amount of offsets "D2" and "D1" should be sufficient to provide proper wire contact as it passes through the tube. In contact tubes of this invention the three major points of wire contact are at internal bore surface areas adjacent to points "S," "T," and "U." At the terminal end "U" of the tube the major amount of current transfer takes place. This is desirable in that excessive heating of the welding wire, due to current, is not produced. Excessive heating of the wire or electrode may result in softening or melting of the wire. Since the current transfer is substantially constant at the terminal end "U," greater control over the welding arc or greater arc stability results.

Generally the value of offset "D2" should be greater than about one-fourth the diameter D of the tube stock. For "D1," the offset should generally be greater than about one-half the diameter D of the tube stock. The offset amounts should not be excessive, as this may lead to wire feeding problems. For tubes with a diameter D of about one-quarter inch, the amount of offset D2 should be in the range of about 0.060 inch to about 0.110 inch. Preferably D2 should be in the range of about 0.090 inch to about 0.110 inch. For D1 the amount of offset should be in the range of about 0.135 inch to about 0.170 inch. Preferably D1 should be in the range of about 0.140 inch to about 0.160 inch.

Table No. I is illustrative of tube members and the contact tubes made according to the procedures of this invention. The reference letters are those used in the drawings and refer to the tube member and the bent contact tube made from said tube member.

TABLE NO. I

*Contact Tubes and Tube Members* [1]

[Dimensions (inches)]

| Tube Member/Tube | L | E | D | D2 | D1 | B′ | C′ | D′ |
|---|---|---|---|---|---|---|---|---|
| 1 | 4 | 0.040 | 0.25 | 0.100 | 0.155 | 1.75 | 1.18 | 1.06 |
| 2 | 4 | 0.060 | 0.25 | 0.100 | 0.155 | 1.75 | 1.18 | 1.06 |
| 3 | 4 | 0.084 | 0.25 | 0.100 | 0.155 | 1.75 | 1.18 | 1.06 |
| 4 | 4 | 0.120 | 0.25 | 0.100 | 0.145 | 1.75 | 1.18 | 1.06 |

[1] In the above table, the length of heat treatment portion "O" was two inches, while the distance N was one-half inch, for all the heat treated tube members.

In the practice of this invention tube members 9A having an overall length "L" in the range of three inches to seven inches are useful. The outside diameter "D" should be in the range of about one-quarter inch to one-half inch; and the internal diameter "E" should be in the range of approximately 0.040 inch to 0.110 inch. Because of the variety of welding wires and electrodes to be handled, there are a variety of bent contact tubes that may be manufactured. In general the internal bore diameter is slightly larger than the diameter of the welding wire to be accommodated. Satisfactory contact tubes generally have a ratio of bore diameter to welding wire diameter of 1.25/1 to 2.0/1. Thus, these contact tubes are generally used with electrodes or welding wires having a range of diameters of 0.025 inch to 0.093 inch.

In the contact tubes of this invention, the welding wire enters the bent contact tube and travels in a straight line path for a short distance, and then is subjected to a change of direction off the straight line path for a short distance and is then again subjected to another change of direction. By subjecting the welding wire to these various changes in direction, there is insured adequate and satisfactory contact with the wall of the bent contact tube, which results in satisfactory current conduction. The bent contact tube also provides for current transfer at the terminal end of the contact tube which results in arc voltage stability. By the heat treatment procedures outlined, the straight tube member is stress relieved, so that it maintains the bent configuration after the bending operation. Also, the tube is not softened sufficiently to interfere with wearing properties. The bending process is also advantageous in that work hardening results which helps to recover some of the hardness lost through the heat treatment or annealing.

While preferred embodiments of the invention have been described, it is to be understood that changes and variations may be made without departing from the spirit and scope of the invention as defined by the appended claims.

We claim:

1. A contact tube for the introduction of arc welding current to a moving wire electrode passing therethrough which comprises a hard drawn copper tube having a wire entrance end and a wire exit end, said tube being stress relief annealed only in a zone intermediate its ends whereupon the end portions retain substantially all of their original hardness, a first bend in the annealed zone to deflect the axis of the tube in one direction less than the amount that would exceed the elastic limit if the area bent were not annealed, and a second bend in the annealed zone to deflect the axis of the tube in the opposite direction less than the amount that would exceed the elastic limit if the area bent were not annealed but more than the amount of the said first bend to cause the unannealed exit end portion of the tube to be deflected back toward the original axis to assure a point of contact between the tube and the wire passing therethrough in the unannealed zone constituting the exit end portion of said tube.

2. A contact tube according to claim 1 in which the centerline of the tube has a maximum deflection of from one fourth to one half of the outside diameter of said tube.

3. A contact tube according to claim 2 in which the outside diameter of the tube is within the range of from 0.25 inch to 0.50 inch, the length of the tube is within the range of from 3 inches to 7 inches and the annealed zone terminates about 0.50 inch from the exit end of said tube.

References Cited in the file of this patent

UNITED STATES PATENTS

| | | |
|---|---|---|
| 1,508,691 | Glasser | Sept. 16, 1924 |
| 2,830,363 | Reiter | Apr. 15, 1958 |